United States Patent

Minoura et al.

[11] 4,264,119
[45] Apr. 28, 1981

[54] SCANNING OPTICAL SYSTEM

[75] Inventors: Kazuo Minoura; Takashi Nakano, both of Yokohama, Japan

[73] Assignee: Canon Kabushiki Kaisha, Tokyo, Japan

[21] Appl. No.: 920,274

[22] Filed: Jun. 29, 1978

[30] Foreign Application Priority Data

Jul. 6, 1977 [JP] Japan .................................. 52-80585

[51] Int. Cl.³ .............................................. G02B 27/17
[52] U.S. Cl. ........................................ 350/6.6; 358/199
[58] Field of Search ...................... 350/9.1, 8, 285, 6.6, 350/208; 352/6.5; 355/66; 358/199; 346/76 L; 250/236; 235/201 ME

[56] References Cited

U.S. PATENT DOCUMENTS

| | | | |
|---|---|---|---|
| 3,719,780 | 3/1973 | Gazard et al. | 350/6.91 |
| 3,799,644 | 3/1974 | Street | 350/6.91 |
| 3,919,527 | 11/1975 | Bowen et al. | 350/6.6 |
| 4,003,626 | 1/1977 | Reinke et al. | 350/6.91 |

*Primary Examiner*—John K. Corbin
*Assistant Examiner*—B. W. de los Reyes
*Attorney, Agent, or Firm*—Fitzpatrick, Cella, Harper & Scinto

[57] ABSTRACT

A scanning optical system is disclosed in which a beam once deflected by a first deflector is again scanned by a second deflector which is different from the first one. In the scanning optical system of the invention, the beam once deflected by the first deflector is scanned in a plane normal to the reference deflection plane which is formed by the normal of deflection surface of the second deflector when the latter rotates. This assures that the beam deflected by the second deflector is contained in a plane which forms always a definite angle relative to the reference deflection plane of the second deflector.

2 Claims, 9 Drawing Figures

SCANNING OPTICAL SYSTEM

BACKGROUND OF THE INVENTION

1. Field of the Invention

The present invention relates to a scanning optical system.

2. Description of the Prior Art

In carrying out deflection scanning of a beam by rotating or rotationally oscillating the reflecting surface of a deflector according to the prior art, the beam incident upon the deflector is so directed as to enter it in the direction parallel to the reference deflection plane of deflector. For the purpose of this specification, the term "reference deflection plane of deflector" means such a plane which a normal of reflecting surface of the deflector describes when the deflector rotates.

On the other hand, it is known that a substantial reduction in size of the deflecting surface of deflector is allowed when the incident beam has a certain definite angle relative to the reference deflection plane of deflector. However, in this case, the surface which the deflected beam describes is not a plane surface but a conical one. This is disadvantageous when linear scanning is desired.

SUMMARY OF THE INVENTION

Accordingly, it is a general object of the invention to provide a scanning optical system which enables the beam deflected by a deflector to effect plane scanning even when the scanning beam enters the deflector in a direction which is not parallel to the reference deflection plane of deflector.

To attain the above object according to the invention there is provided a scanning optical system comprising a main deflector for deflecting a beam scanning a scanned surface and an optical system for making the scanning beam enter the deflector with a predetermined angle relative to the reference deflection plane of the main deflector. The optical system includes means for deflecting the beam incident upon the main deflector in a plane which crosses the reference deflection plane of the main deflector at a right angle.

In the scanning optical system according to the invention, the deflecting system is formed by a first deflector (subdeflector) and a second deflector (main deflector) disposed opposite to each other. A collimated beam deflected by the first deflector enters the second deflector with a certain angle relative to the reference deflection plane of the second deflector. The deflection plane described by the beam deflected by the first deflector crosses the reference deflection plane of the second deflector at a right angle. The angle formed between the reference deflection plane of the second deflector and the collimated beam incident upon the second deflector after being deflected by the first one changes with time. By this action of the first deflector it becomes possible for the scanning beam deflected by the second deflector to effect linear scanning on the scanned surface.

According to the invention, the plane containing the beam scanned by the second deflector makes always a definite angle with the reference deflection plane of the second deflector. Therefore, it becomes possible to linearly scan a surface to be scanned when a scanning imaging lens is disposed between the second deflector and the scanned surface which has one of its focal planes on the scanned surface.

Other and further objects, features and advantages of the invention will appear more fully from the following description taken in connection with the accompanying drawings.

DESCRIPTION OF THE PREFERRED EMBODIMENTS

Figure 1:
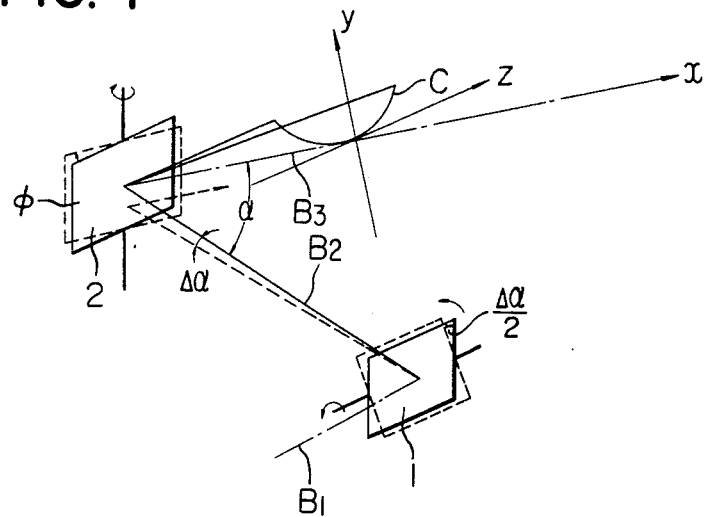
FIG. 1 is a perspective view of one embodiment of scanning optical system according to the invention.

The principle of the scanning optical system of the invention will be described with reference to FIGS. 1 and 2.

In the drawing, 1 is a subdeflector and 2 is a main deflector, both of which are, in the shown embodiment, oscillating mirrors. Designated by 3 is the above described reference deflection plane of the main deflector, that is, a plane which a line normal of deflecting surface of the main deflector 2 describes when the main deflector rotates (a plane extending in the direction normal to the plane of the drawing). A stationary beam $B_1$ is deflected by the subdeflector 1 to form beam $B_2$. Deflected by the subdeflector 1, the beam $B_2$ forms a plane which crosses the reference deflection plane at a right angle. In other words, the beam $B_2$ is deflection-scanned in a plane intersecting the reference deflection plane at a right angle.

When the main deflector 2 is in its reference oscillating position, that is, in the center of oscillating movement, beam $B_3$ deflected by the main deflector 2 lies in the plane which the beam $B_2$ forms. A x,y,z coordinate system shown in FIGS. 1 and 2 has its x-axis in the direction of beam $B_3$ deflected by the main deflector 2 being in its reference position of oscillation. Z-axis is taken along the direction which is parallel to the deflecting surface of the main deflector being in its reference oscillating position and which intersects the rotation axis of the deflecting surface at a right angle. Y-axis is taken in the direction normal to x-z plane formed by the above x-axis and z-axis. In the coordinate system thus determined, the above mentioned beam $B_2$ is deflected within x-y plane of the coordinate.

Let (l', m', n') denote the direction cosine of beam $B_2$ and (l'', m'', n'') that of beam $B_3$, then the respective direction cosines for the case where the main deflector is in its reference position of rotation can be represented by:

$$(l', m', n') = (l'_0, m'_0, 0), (l'', m'', n'') = (1, 0, 0)$$

On the other hand, let (Ex, Ey, Ez) denote the direction cosine of the normal of reflecting surface of the main deflector 2, then the following relation holds:

$$\begin{aligned} l'' &= l' - 2(l'Ex + m'Ey + n'Ez)Ex \\ m'' &= m' - 2(l'Ex + m'Ey + n'Ez)Ey \\ n'' &= n' - 2(l'Ex + m'Ey + n'Ez)Ez \end{aligned} \quad (1)$$

Figure 2:
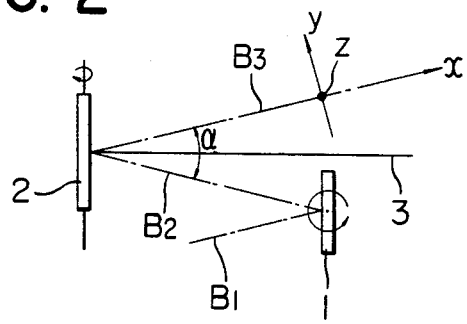
FIG. 2 is a side view thereof.

If the beam $B_2$ were directed to the main deflector, as in the optical system of the prior art, to have direction cosine of $l' = l'_0$, $m' = m'_0$, $n' = n'_0 = 0$ wherein $l'_0$ and $m'_0$ are constants, and if the beam $B_2$ were a fixed beam, then the beam $B_2$ would be deflected by the main deflector 2 to form a curved surface C as shown in FIG. 1. Such a curved surface deflection must be obviated. According to the invention to attain the object, the subdeflector 1 is oscillated, for example, in such manner that beam $B_3$ deflected by main deflector 2 is always parallel to the x-z plane. As described above, this may be achieved by deflecting the beam by the main deflector 2 while keeping a certain definite angle between the deflected beam $B_3$ and the reference deflection plane 3. As an example, the case wherein the deflected beam $B_3$ always runs parallel to the x-z plane will be analyzed hereinafter.

Provided that the beam $B_3$ deflected by the main deflector 2 becomes parallel with the x-z plane when the subdeflector 1 rotates by $\Delta\alpha/2$ during the rotation of the main deflector 2 by $\phi$ from the reference position of rotation, the direction cosine (Ex, Ey, Ez) is given by:

$$\begin{aligned} Ex &= \cos\phi \cdot \cos\frac{\alpha}{2} \\ Ey &= -\cos\phi \cdot \sin\frac{\alpha}{2} \\ Ez &= \sin\phi \end{aligned} \quad (2)$$

wherein $\alpha$ is angle which the beam $B_2$ and x-axis form. Also, the direction cosine of beam $B_2$ is given by:

$$\begin{aligned} l' &= -\cos(\alpha + \Delta\alpha) \\ m' &= \sin(\alpha + \Delta\alpha) \\ n' &= 0 \end{aligned} \quad (3)$$

Substituting the equations (2) and (3) in the above equation (1) with regard to $m''$ and $n''$ gives:

$$m'' = \sqrt{a^2 + b^2} \sin(\Delta\alpha + \beta) \quad (4)$$

$$a = 1 - 2\sin^2\frac{\alpha}{2} \sin^2\phi$$

$$b = \sin\alpha \cdot \sin^2\phi \quad (5)$$

$$\beta = \arctan[b/a]$$

$$n'' = \sin 2\phi \cdot \cos(\frac{\alpha}{2} + \Delta\alpha) \quad (6)$$

To satisfy the condition that beam $B_3$ be in parallel to the x-z plane at that time, $m''$ should be; $m'' = 0$. Therefore, it gives:

$$\Delta\alpha = -\beta = -\arctan[\sin\alpha \sin^2\phi/(1 - 2\sin\frac{2\alpha}{2} \sin^2\phi)] \quad (7)$$

From this equation it is clear that all of beams $B_3$ deflected by the second deflector can be kept parallel to the x-z plane when the subdeflection is carried out in a manner that the rotational angle $\Delta\alpha/2$ of the subdeflector 1 always satisfies the equation (7) relative to the rotational angle $\phi$ of the main deflector 2.

Figure 3:
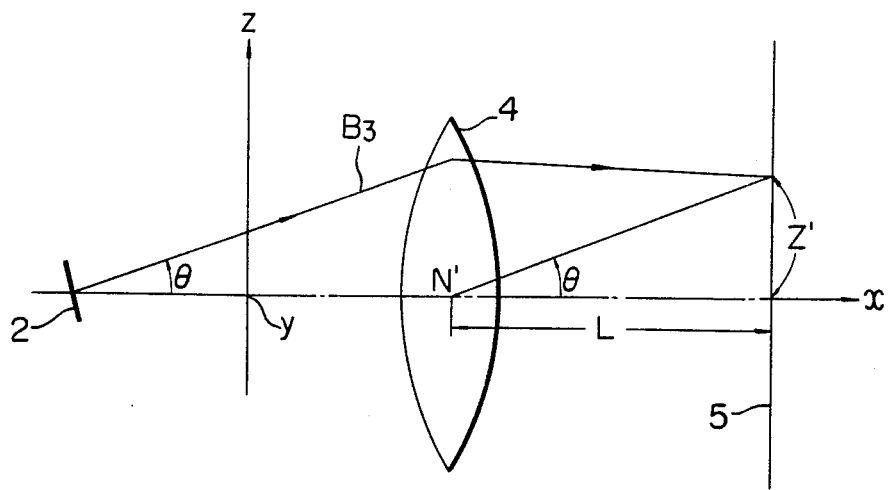
FIG. 3 is a detailed view of the optical system disposed between the main deflecting device and the scanned surface in the embodiment shown in FIG. 1.

FIG. 3 schematically shows the optical system disposed between the main deflector 2 and the surface to be scanned viewing in the direction of y-axis of the coordinate system in FIG. 1.

Designated by 4 is a scanning imaging lens and 5 is a surface to be scanned with which one focal plane of the lens 4 coincides. Let $\theta$ denote the angle which the projected light forms with the x-axis when the beam $B_3$ deflected by the main deflector 2 is projected on the x-z plane, then $$n'' = \sin\theta \quad (8)$$

Using this in equation (6) gives:

$$\theta = \arc\cdot\sin[\sin 2\phi \cdot \cos(\frac{\alpha}{2} + \Delta\alpha)] \quad (9)$$

When beam $B_3$ is imaged on the scanned surface 5 through the imaging lens 4 in FIG. 3, the image point $Z'$ on the scanned surface is an intersection point of the scanned surface 5 and the line which forms angle $\theta$ with the image side nodal point N' of the imaging lens 4. This nodal point N' varies with angle $\theta$ and when the distance between the nodal point N' and the scanned surface 5 is L, then $z'$ becomes:

$$z' = L\cdot\tan\theta \quad (10)$$

On the other hand, since $z'$ may be considered to be in proportion to angle of rotation $\phi$, $y'$ becomes:

$$y' = K\cdot\phi \quad (11)$$

wherein K is constant.
Using equations (10), (11) gives:

$$L = K\cdot\phi/\tan\theta \quad (12)$$

When $\phi$ is small, the above equations (7) and (9) give:

$$\tan\theta \approx 2\phi\cdot\cos(\alpha/2) \quad (13)$$

and at this time L becomes f, that is, paraxial focal length of the imaging lens 4.
So $$f = K/(2\cos\frac{\alpha}{2}).$$

Therefore, $$K = 2f\cos(\alpha/2) \quad (14)$$

This alters equation (12) to:

$$L = (2f\cos\frac{\alpha}{2})\phi/\tan\theta \quad (15)$$

where $\theta$ is given by (9).

As will be understood from the above, when the image side nodal point N' of the scanning imaging lens 4 moves with change of the angle $\theta$ as given by equation (15), the imaging position on the scanned surface 5 which is also the focal plane of the imaging lens 4 is in proportion to the rotation angle $\theta$ of the main deflector 2. Equation (15) represents the distortion characteristics of the imaging lens 4 and the amount of distortion $\Delta z'$ can be represented by:

$$\Delta z' = (L - f)\tan \theta = f(2\phi \cos \frac{\alpha}{2} - \tan \theta) \quad (16)$$

If the main deflector and the subdeflector are rotated or rotationally oscillated while holding the relation of $\phi$ and $\Delta\alpha$ shown in (7), then the beam deflected by the main deflector will always form a certain definite angle with the reference deflection plane of the main deflector. However, it is practically very difficult to operate both the deflectors in such manner as to hold the relation of equation (7). To solve this difficulty, the rotation of the subdeflector 1 for the range of rotation of the main deflector 2 of $(2m\pi - \phi_0) \leq \phi \leq (2m\pi + \phi_0)$ is represented, as a sine function, by:

$$\Delta\alpha = k_1[\cos k_2\phi - 1] \quad (17)$$

wherein $k_1$ and $k_2$ are optional constants.

It has been found that the above formula (17) is very useful as an approximate formula for (7). The result obtained by operating the deflectors according to the formula (17) is approximately equal to that obtained according to (7) with respect to the relation between $\Delta\alpha$ and $\phi$.

Figure 4:
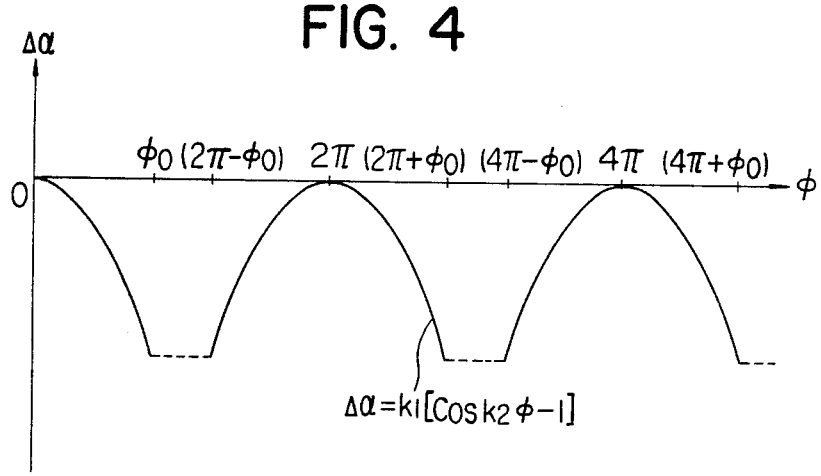
FIGS. 4 and 5 show some examples of voltage signal relating to driving system for subdeflecting means respectively.

FIG. 4 shows the relation between $\Delta\alpha$ and $\phi$ obtained by formula (17). Herein $\phi_0$ is effective scanning angle and m is integer.

For example, in case that $$\begin{matrix} \alpha = 30° \\ k_1 = 19.88 \\ k_2 = 1.7 \end{matrix} \quad (18)$$

the corrected deflection angle obtained according to formula (17) was found to have an error of only some 0.02% to the result obtained by (7) when $\phi = 30°$.

Figure 5:
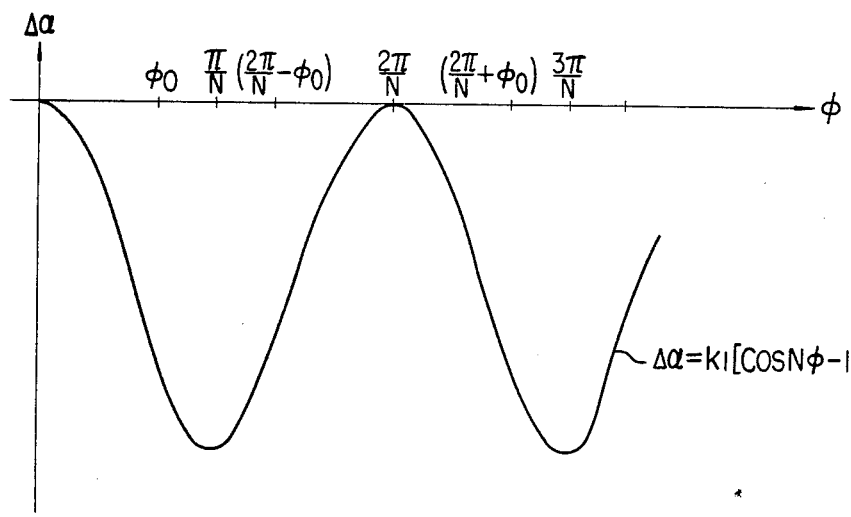

In case that the main deflector is a rotary polyhedron having surfaces of N in number, an effective result also can be obtained using formula (17) as an approximation to (7) when $k_1$ is suitably selected taking the range of approximation into account, provided that $k_2 = N$. FIG. 5 shows the relation between $\Delta\alpha$ and $\phi$ in this case.

Figure 6:
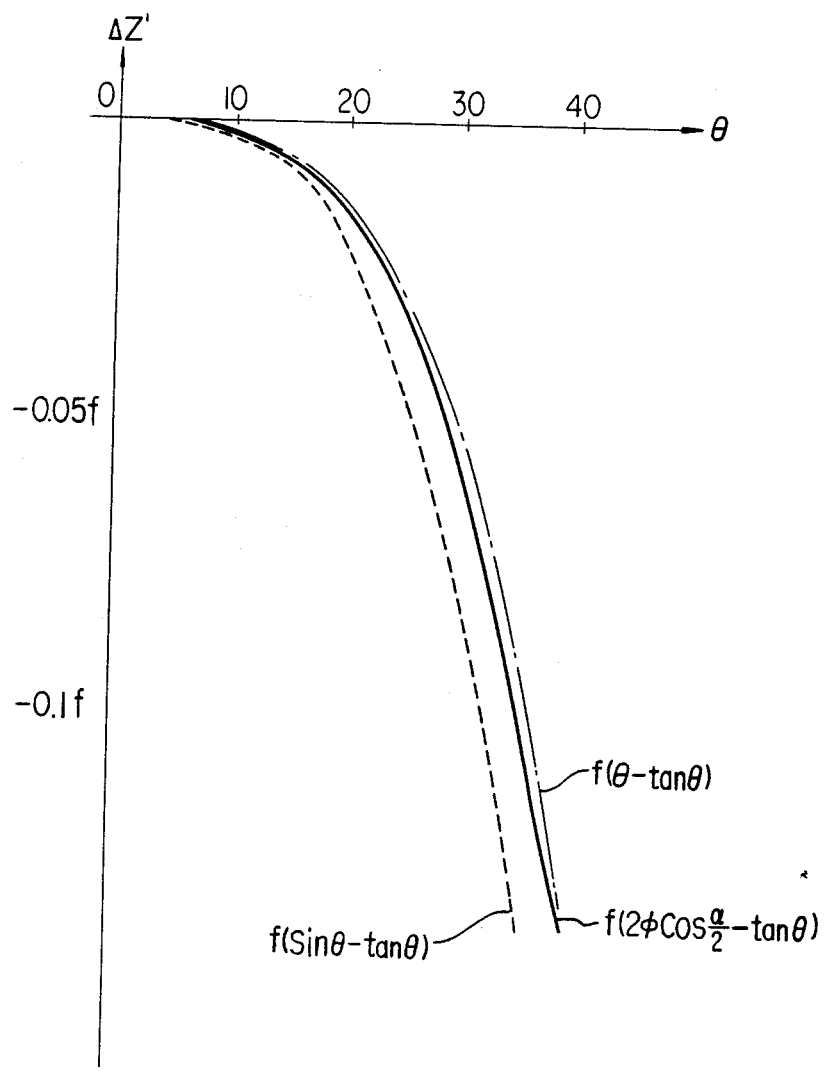
FIG. 6 is a relation curve of beam scanning at a uniform speed on the scanned surface showing other curves at the same time for comparison's sake.

When $\alpha$, $k_1$ and $k_2$ are values in (18), the relation curve of distortion value $\Delta z'$ of the imaging lens 4 and incidence angle $\theta$ of beam incident upon the imaging lens 4 is shown in FIG. 6 in solid line which is obtained by using equations (9), (16) and (17). For the sake of comparison, the amount of distortion of f·sin $\theta$ lens (broken line curve) and that of f·$\theta$ lens (one-point-chain line curve) are also shown in FIG. 6.

Now, referring to FIGS. 7A and 7B description will be made of one example of driving system used for operating the subdeflector according to formula (17).

Figure 7A:
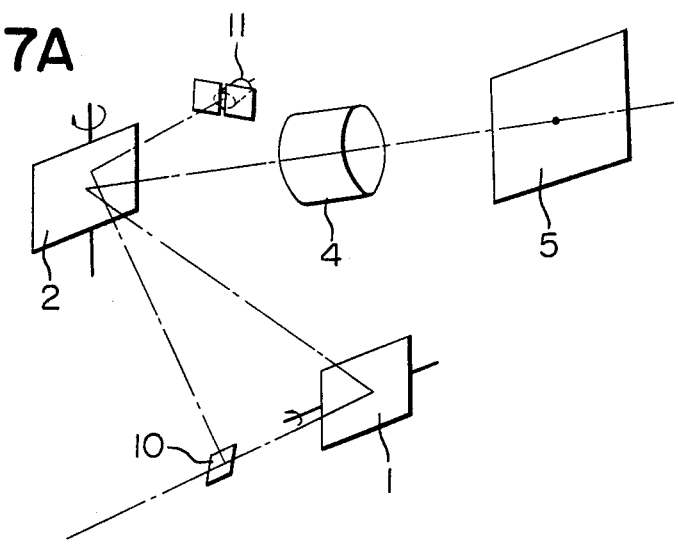
FIG. 7A is a perspective view showing a concrete example of an arrangement of the scanning optical system according to the invention.
Figure 7B:
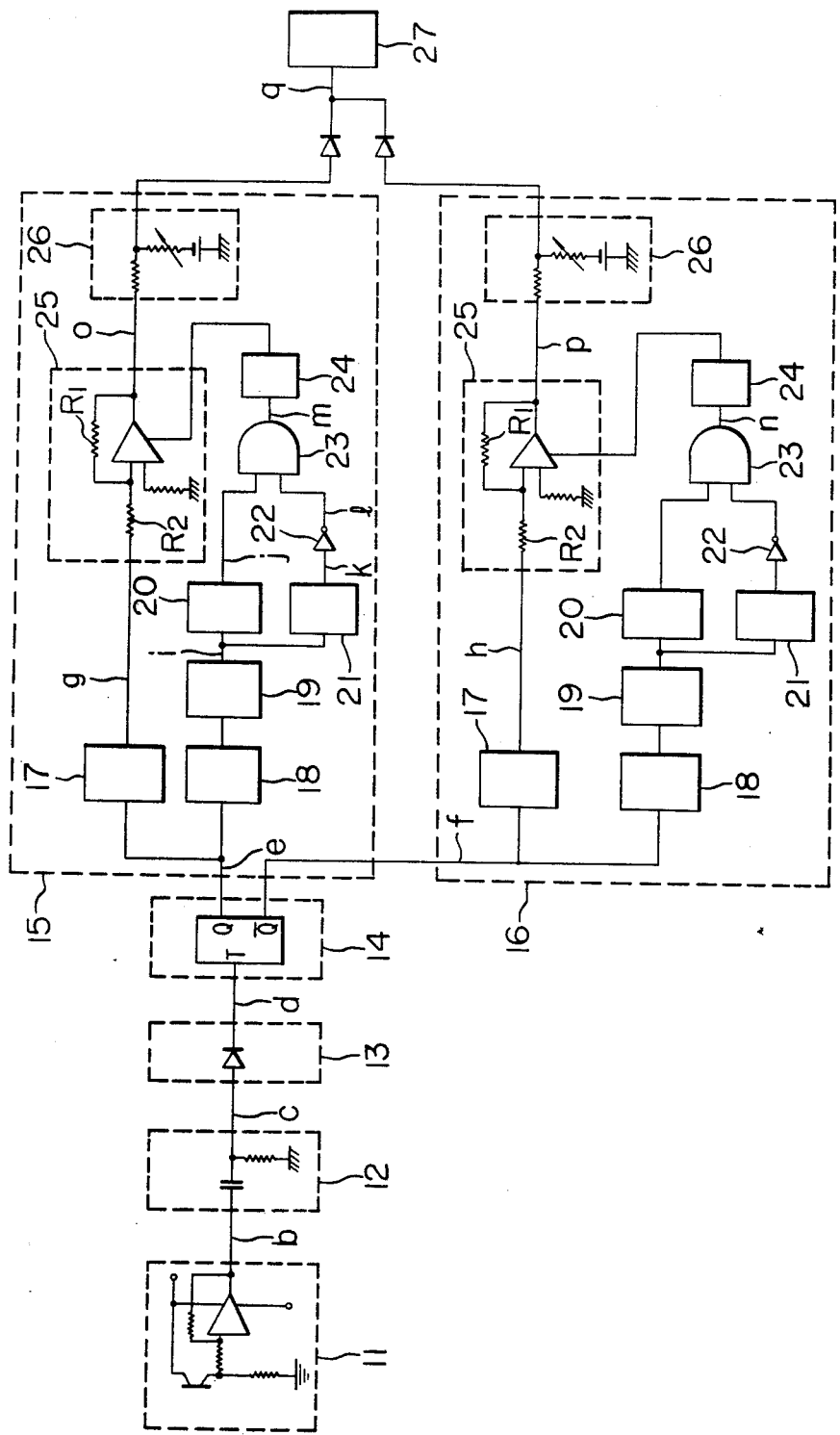
FIG. 7B shows one example of circuit used for driving the subdeflector shown in FIG. 7A.
Figure 8:
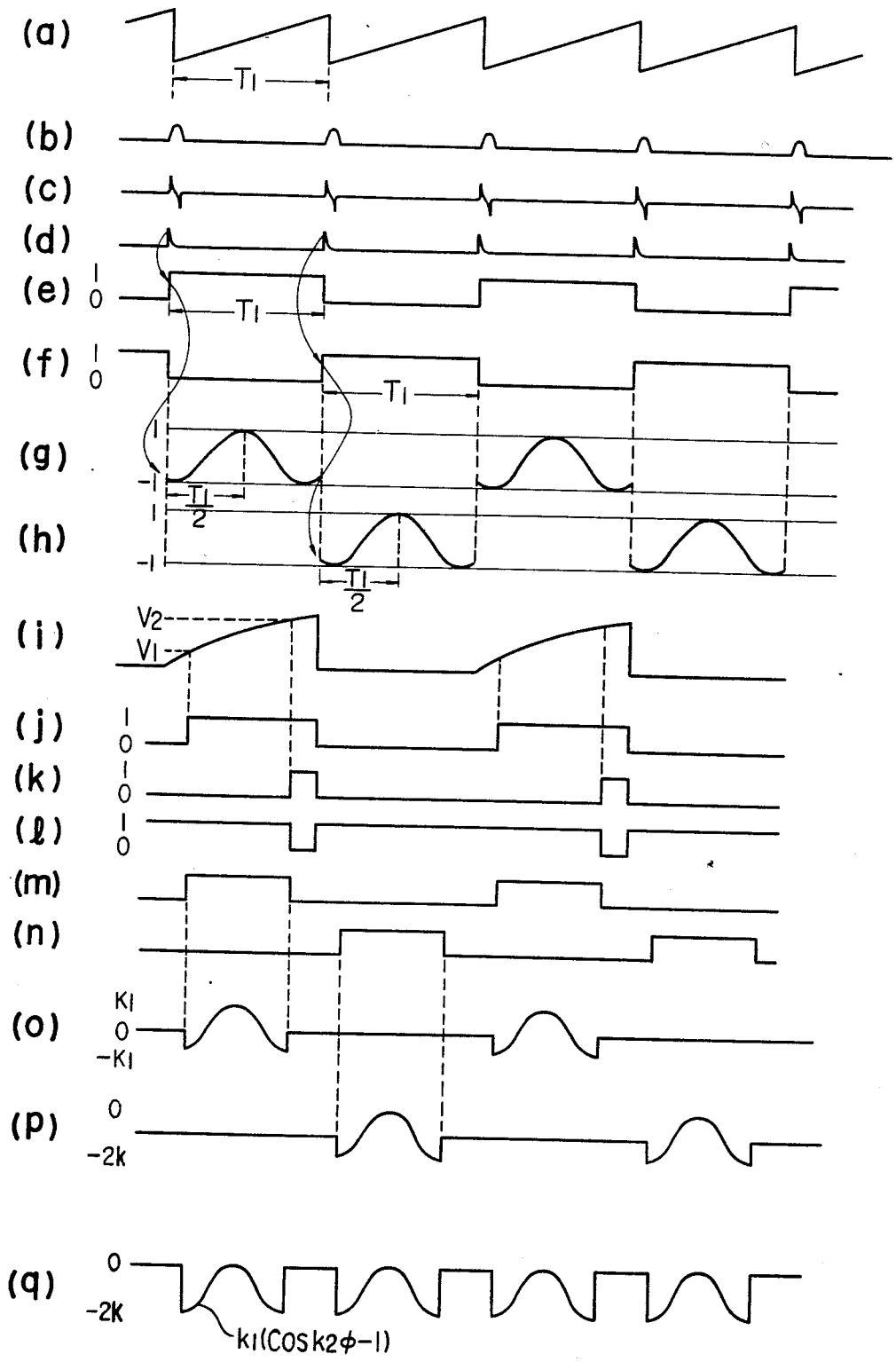
FIG. 8 is a time chart of the circuit shown in FIG. 7B.

In the scanning optical system according to the invention shown in FIG. 7A, a part of a beam incident upon the subdeflector 1 is taken up by means of a half mirror 10 and the beam is introduced to the deflecting surface of the main deflector 2. Then the beam is detected by a photo detector 11 so that the two deflectors 2 and 1 may be synchronized. The subdeflector may be a galvano mirror, rotary polygon mirror, acousto-optical element, electro-optical element or other deflecting means. In the shown embodiment, a galvano mirror is used as the subdeflector 1. Also, a galvano mirror oscillating at a uniform speed is used as the main deflector 2. FIG. 7B shows an embodiment of electric circuit used for driving the subdeflector 1 according to formula (17) and FIG. 8 is a time chart thereof. For the optical system shown in FIG. 7 the same coordinate as that in FIG. 1 is applied. Therefore, in the following description, reference is also made to FIG. 1.

The center of oscillation of the main deflector 2 lies in the x-y plane of the coordinate system and therefore the main deflector moves oscillating around the x-y plane as a center by uniform angle. Signal (a) in FIG. 8 is a saw-tooth voltage signal applied to the driving system for the main deflector. $T_1$ is cycle of the signal. Since the main deflector oscillates at a uniform speed, at the time point when time of $T_1/2$ has been passed from the time of a voltage signal being applied to the main deflector, the beam deflected by the reflecting surface of the main deflector 2 exists in the x-y plane.

A photo detecting optical system (10, 2, 11) is provided to detect the starting time of rotation of the main deflector and to synchronize the operation of the subdeflector with that of the main one. From the photo detecting optical system is obtained a signal for synchronization which is shown as signal (b) in FIG. 8. Of course, there may be used other various means to obtain such a synchronizing signal. For example, rotational position of rotation axis of each the deflector may be directly detected to obtain the signal. In the photo detecting optical system in the shown embodiment, there is contained a photo-electric detecting device into which light is introduced whenever the main deflector 2 is in its starting position for rotation. This photo detector of the photo detecting optical system is designated by 11 in FIG. 7B. This photo detector 11 produces signal (b) which is, therefore, in timing with the rising of signal (a).

The signal (b) is introduced into a differentiation circuit 12 from the photo detector 11 to form a signal (c) which is then transformed into a signal (d) by a rectifying circuit 13 which cuts off the negative portion of the input signal. The signal (d) is put into a T-type flip-flop circuit 14 which puts out signal (e) or (f) alternately from Q or $\bar{Q}$ respectively when the input signal (d) comes in. The duration of the output signal (e), (f) from the flip-flop circuit 14 is equal to the cycle $T_1$ of the above mentioned saw-tooth wave signal. Circuit 15 into which the output signal (e) from the one terminal Q is introduced and circuit 16 into which the output signal (f) from another terminal $\bar{Q}$ is introduced, are entirely same to each other. Therefore, description is made only as to the circuit 15.

Signal (e) put out from the terminal Q of the T-type flip-flop circuit 14 in accordance of signal (d) from the rectifying circuit 13 is introduced into a function generator circuit 17 and also into a control circuit 18 for control the start of CR time constant circuit. The function generator circuit 17 generates a function (g) of cos $K_2\phi$ wherein $K_2$ is constant and $\phi$ is rotation angle of main deflector. The circuit 17 is able to generate the function (g) from any phase. In the function generator circuit 17, the phase of cos $K_2\phi$ at generation is so preset that cos $K_2\phi = 1$ only when a time of $T_1/2$ has been passed after starting the generation of a function (g) of cos $K_2\phi$. At the time point when cos $K_2\phi = 1$, the reflecting surface of the main deflector is in the center of oscillation and the beam reflected by the reflecting surface of the main deflector exists in the x-y plane.

On the other hand, the start control circuit 18 received the signal (e) brings the CR time constant circuit 19 into operation. Signal (i) from the CR time constant circuit enters switching circuits 20 and 21. Switching circuit 20 generates a signal (j) when the input signal exceeds the voltage level of $V_1$ whereas switching circuit 21 generates a signal (k) when the input signal exceeds the voltage level of $V_2$ which is higher than $V_1$. Values of $V_1$ and $V_2$ are determined by the above described effective scanning angle $\phi_0$.

Rising of signal (e) entering the control circuit 18 makes the CR time constant circuit 19 turned ON so as to discharge the stored charge in CR circuit. Signal (k) from the switching circuit 21 is inverted into signal (l) by an inverter circuit 22 and the signal (l) is introduced into AND-gate 23 together with the signal (j). AND gate 23 has an output when the above signals (j) and (l) are in the state of 1. The output from the AND gate 23 enters switching circuit 24 which transmits the signal from function generator circuit 17 to level shift circuit 26 through an amplifying circuit 25 only when a signal from AND gate 23 is being put into the switching circuit 24. When passing through the amplifying circuit 25, signal is amplified by an amount corresponding to the ratio of value of resistance $R_1$ to that of resistance $R_2$, namely $k_1 = R_2/R_1$. Signal (o) from the amplifying circuit 25 is levelled down by $k_1$ by a level adjusting circuit 26.

Also, in another circuit 16, signal is processed in the same manner. Signals alternately produced from the circuits 15 and 16 are combined into a signal (g). This signal (g) corresponds to the above described formula (17) and is used to drive the galvano mirror (27) of the subdeflector. Therefore, when a saw-tooth wave signal (a) is put into a driving system for the main deflector, a signal (g) as described above is applied to a driving system for the subdeflector in synchronism with the signal (a).

What we claim is:

1. A one-dimensional scanning optical system comprising:
    a main deflector for effecting beam scanning on a surface to be scanned;
    imaging optical means disposed between said main deflector and said surface to be scanned for imaging a collimated beam on the scanned surface;
    a beam supplying means;
    sub-deflector means for deflecting the beam supplied by said beam supplying means, and directing the deflected beam to said main deflector, wherein the deflecting plane of said sub-deflector includes the optical axis of said imaging optical means, and is normal to the main deflection reference plane which a normal of the deflecting surface of said main deflector describes when it rotates, and the rotational angle of the subdeflector is proportional to $\cos k\phi - 1$, where $\phi$ is the rotational angle of the main deflector and k is a constant; and
    means for oscillating said main deflector and subdeflector in synchoronism with one another.

2. A one-dimensional optical system comprising:
    a main deflector for effecting beam scanning on a surface to be scanned;
    imaging optical means disposed between said main deflector and said surface to be scanned for imaging a collimated beam on the scanned surface;
    beam deflecting means for deflecting the beam in a plane which includes the optical axis of said imaging optical means, and is normal to the main deflection reference plane which a normal of the deflecting surface of said main deflector describes when it rotates, wherein the change in the incident angle of the beam directed from said beam deflecting means to said main deflector, is porportional to $\cos k\phi - 1$, wherein k is a constant, and $\phi$ is the rotational angle of the main deflector; and
    means for oscillating said main deflector and said subdeflector in synchronism with one another.

* * * * *